Oct. 17, 1933.  S. B. DUNLAP, SR  1,930,928
MOUNTED DEVICE
Filed Dec. 28, 1928
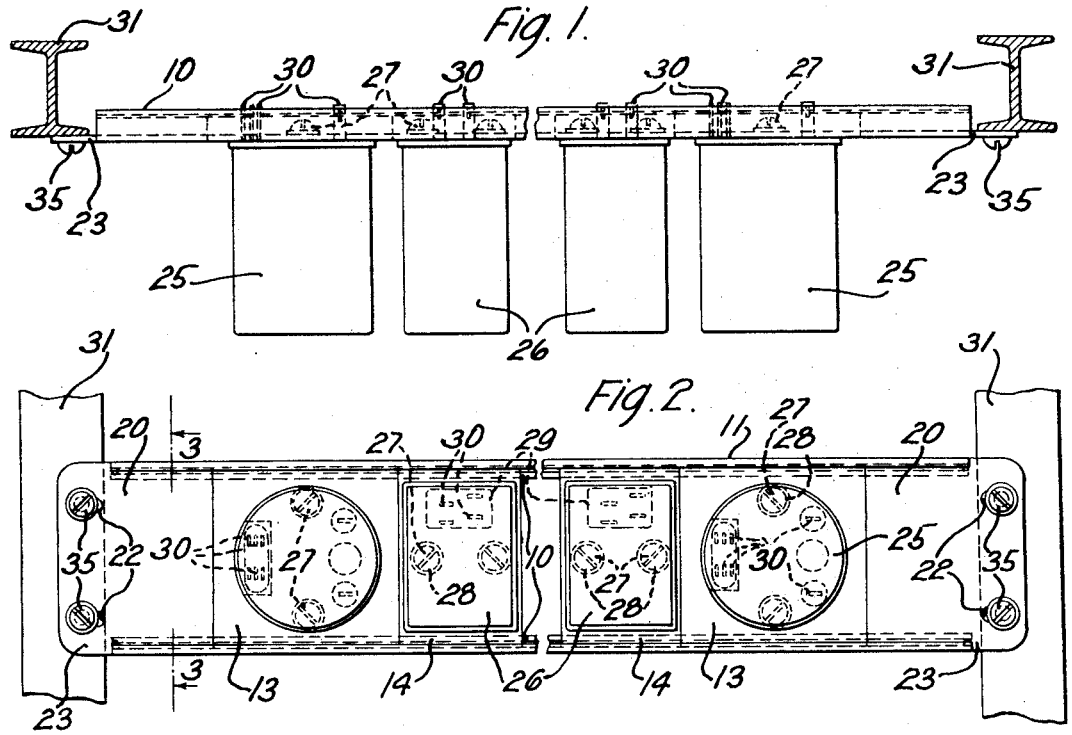
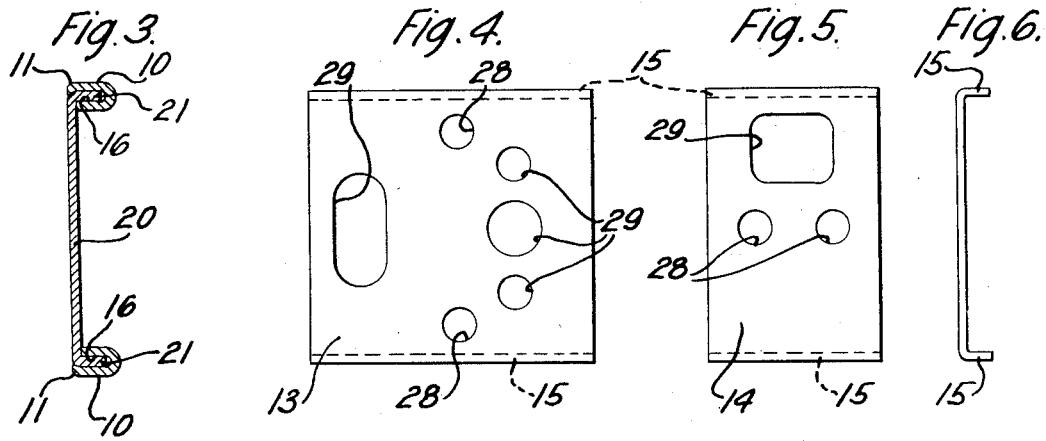
Inventor
Scott B. Dunlap, Sr.
By Ha Cattersn Att'y.

Patented Oct. 17, 1933

1,930,928

UNITED STATES PATENT OFFICE 1,930,928

MOUNTED DEVICE

Scott Bruce Dunlap, Sr., Maplewood, N. J., assignor to Western Electric Company, Incorporated, New York, N. Y., a corporation of New York Application December 28, 1928
Serial No. 329,000

4 Claims. (Cl. 248—35)

This invention relates to mounting devices, and more particularly to devices for mounting or supporting electrical apparatus employed in telephone systems.

In telephone exchange equipment it is sometimes necessary, on account of circuit requirements, to mount on a common support, closely adjacent and in varying arrangements, several types of apparatus, such as relays, resistances, retardation coils and condensers. In some instances these pieces of apparatus have been mounted by means of a common plate which is specifically drilled in the various positions to accommodate the connecting terminals and mounting means of the particular apparatus designed to occupy those positions.

The object of this invention is to provide a simple and inexpensive mounting device for flexibly and interchangeably accommodating a variety of different types of articles.

In order to accomplish this and other objects, there is provided in one embodiment of the invention a pair of opposed channel members designed to slidingly receive a plurality of units or individual adapter plates which are drilled and otherwise designed to particularly accommodate different types of apparatus, these units being placed in the channels in any desired arrangement. The ends of the channels are closed by means of plates clamped to the channels and provided with apertures for receiving screws for mounting the assembly upon the uprights of a suitable frame or rack.

It is believed that a complete understanding of the invention may be had by reference to the following description taken in conjunction with the accompanying drawing, in which Fig. 1 is a fragmentary plan view of a mounting device, embodying the invention, shown secured to the uprights of a frame and supporting miscellaneous electrical apparatus;

Fig. 2 is a front elevational view thereof;

Fig. 3 is an enlarged sectional view taken on line 3—3 of Fig. 2;

Figs. 4 and 5 are enlarged front elevational views of two of the many different types of adapted plates, and Fig. 6 is an end view thereof.

Referring now to the drawing wherein like reference numerals designate the same parts throughout the several views, a pair of channel members 10—10, preferably made of sheet metal and having overturned flanges 11, are equally spaced in parallel arrangement to receive a plurality of adapter plates 13—14, as clearly shown in Figs. 1 and 2. These adapter plates or units may also be made from heavy sheet metal and are formed with right angled, bent edge portions 15—15 which are designed to engage and slide in channels 16 of the members 10. Each type of adapter plate is particularly provided with a predetermined combination of apertures in size and position to accommodate the connecting terminals and mounting means of the individual piece of apparatus to be secured thereto. It will therefore be understood that the plates 13—14 are shown as representative types for purposes of illustration, and are only two of the many types of plates which are drilled and otherwise designed for mounting miscellaneous apparatus.

A pair of end plates 20—20, having right angled bends 21—21 (Fig. 3) for slidably engaging the channels 16 of the members 10 and for closing the ends thereof, are provided with apertures 22—22 for purposes of mounting in portions 23, against which the ends of the channel members abut when assembled.

In assembling the mounting device to accommodate various types of apparatus in a predetermined arrangement, the different adapter plates for individually mounting each piece of apparatus are inserted in the proper order in the channels 16 of the members 10, and the end plates 20 are placed in position with the inner edges of the offset portion 23 abutting the ends of the members 10. The flanges 11 of the members 10 adjacent the end plates 20 are then crimped to secure the plates against endwise movement. Where only several pieces of apparatus are to be mounted in the spaces between the adapter plates, the flanges 11 of the members 10 adjacent the sides of the adapter plates are crimped to hold them in the desired spaced relationship. Such a mounting of electrical devices used in telephonic communicating systems is illustrated by Figs. 1 and 2, wherein two different types of relays 25—26 are insulatively mounted on the individual adapter plates 13 and 14 and secured thereto by screws 27 extending through apertures 28. Other apertures 29 are provided for permitting the terminals 30 of the relays to protrude beyond the faces of the adapter plates, so that electrical conductors can be readily connected thereto. The complete mounting device with the electrical apparatus assembled thereon is then secured to upright supports 31—31 by screws 35 extending through apertures 22 of the end plates 20 and threaded into the supports.

To disassemble the mounting device, it is only necessary to pry upwardly the crimped portions of the flanges 11 to release the end plates and the adapter plates whereby they can be readily removed from the channels 16 of the members 10.

From the foregoing, it is readily seen that the mounting device is advantageously made in sections of simple construction, whereby they are easily secured together without the use of structural means other than those formed on the parts comprising the mounting. Also, the device may be readily and quickly assembled or taken apart and it can be rearranged to suit different conditions by the mere insertion of various designs of adapter plates.

It is to be understood that the embodiment of the invention herein described and illustrated is merely a convenient and useful form of the invention, which is capable of many other modifications without departing from the spirit and scope of the invention as defined by the appended claims.

What is claimed is:

1. In a device for mounting articles, a plurality of opposed parallel channel members having their channels opening outwardly, a plurality of article supporting plates having bent edge portions engaging the channels, and a pair of plates closing the ends of the channel and clamped thereto for attaching the assembly to a support.

2. In a device for mounting articles, a pair of elongated members having guideways, a plurality of mounting plates of various designs and sizes removably and interchangeably engaging the guideways and supporting miscellaneous articles secured thereto, and end plates removably mounted in the guideways for supporting the members.

3. In a device for mounting articles, a plurality of opposed parallel channel members with their channels opening outwardly, an article mounting member removably secured to the outwardly opened channels, and other members slidably engaged within the channels at the ends thereof for securing them to a support.

4. In a device for mounting articles, a plurality of adapters of various kinds for supporting miscellaneous articles, channel members with channels opening outwardly for removably holding the adapters in any desired combination, and end members removably engaged within the channels of the holding means and serving as a support therefor.

SCOTT BRUCE DUNLAP, Sr.